United States Patent [19]

Hoffman et al.

[11] 4,074,910
[45] Feb. 21, 1978

[54] DISC BRAKE APPARATUS SUITABLE FOR BICYCLES

[75] Inventors: Neil R. Hoffman, Mequon; Johannes H. Jansen, Milwaukee, both of Wis.

[73] Assignee: Brake Engineering, Inc., Milwaukee, Wis.

[21] Appl. No.: 787,354

[22] Filed: Apr. 14, 1977

Related U.S. Application Data

[62] Division of Ser. No. 683,484, May 5, 1976, Pat. No. 4,036,328, which is a division of Ser. No. 606,711, Aug. 21, 1975, Pat. No. 3,985,391.

[51] Int. Cl.² .............................................. B62L 1/00
[52] U.S. Cl. .............................. 280/289 R; 188/18 A; 301/6 E
[58] Field of Search ................... 301/6 E, 6 V, 105 B; 280/200, 289 R; 188/18 A, 26, 71.1, 71.3, 72.2

[56] References Cited

U.S. PATENT DOCUMENTS

| | | | |
|---|---|---|---|
| 348,891 | 9/1886 | Curtis | 188/26 |
| 3,655,015 | 4/1972 | Mennesson | 188/26 X |
| 3,765,511 | 10/1973 | Toyomasu | 188/26 |
| 3,949,838 | 4/1976 | Fuhrman | 188/72.2 X |
| 3,971,457 | 7/1976 | Campagnolo | 188/18 A |

Primary Examiner—Joseph F. Peters, Jr.
Assistant Examiner—Terrance L. Siemens
Attorney, Agent, or Firm—Ira Milton Jones & Associates

[57] ABSTRACT

The rotor of a disc brake apparatus for bicycles comprises a spider that flatwise overlies the outer face of one spoke flange on a wheel hub and is secured by spokes that have their hook portions extending through it and that spoke flange. A flat annular disc has radially inwardly projecting tabs that are secured to the spider and hold the disc in axially spaced relation to the spokes. A U-shaped caliper body straddles an edge portion of the disc. On a shorter leg the body has a fixed brake pad; on its longer leg it carries a movable brake pad that has a compound motion for self-energization. The body is movable in directions parallel to the wheel axis and is carried, in part, by a cup-shaped adapter coaxial to the wheel shaft and confined between a bearing cone for the wheel and an adjacent frame portion. Portions of the body straddle an elongated frame member to confine the body against rotation around the adapter.

7 Claims, 9 Drawing Figures

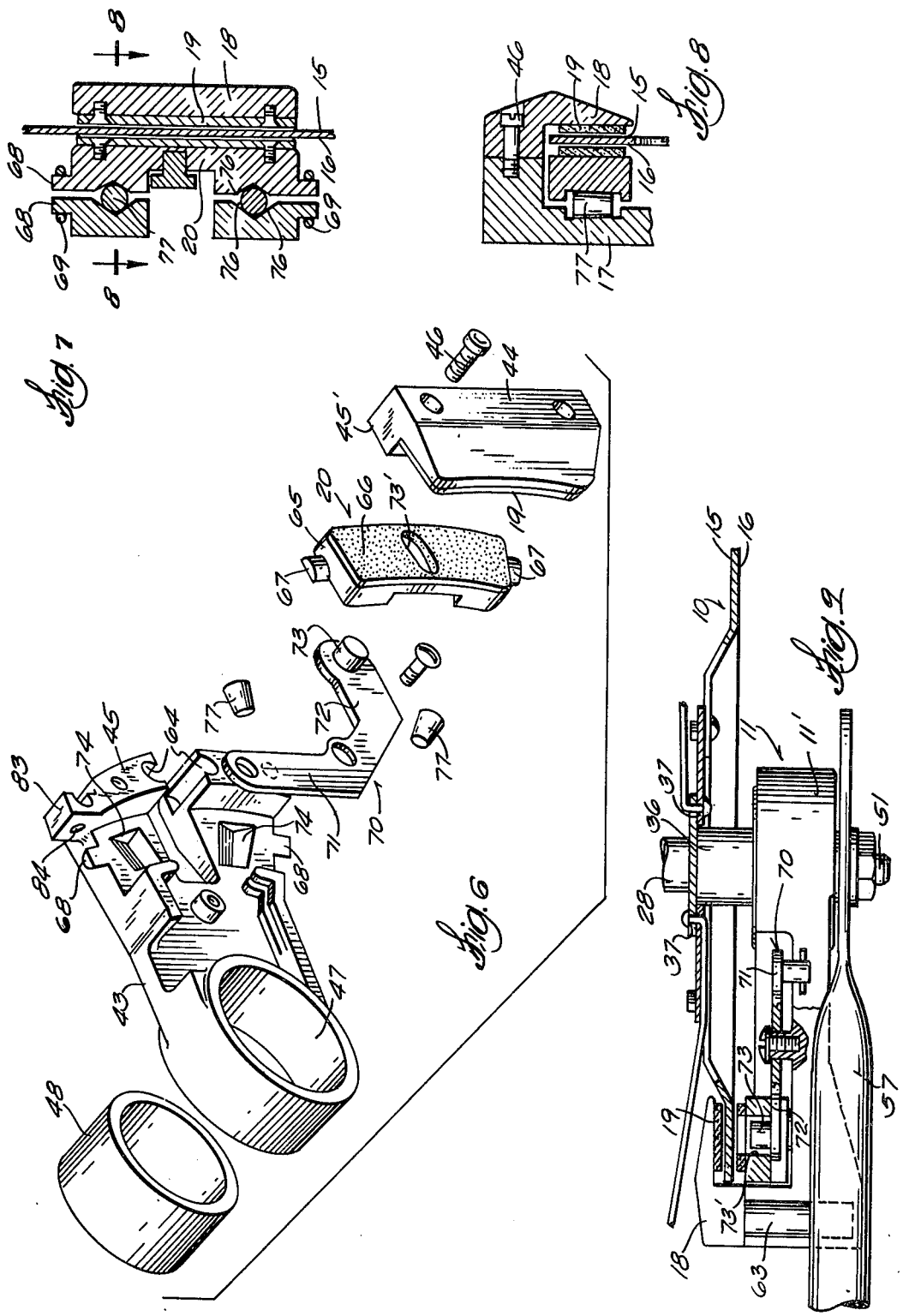

DISC BRAKE APPARATUS SUITABLE FOR BICYCLES

This application is a division of our copending application Ser. No. 683,484, filed May 5, 1976, now U.S. Pat. No. 4,036,328, which was, in turn, a division of an application copending with it, Ser. No. 606,711, filed Aug. 21, 1975, now U.S. Pat. No. 3,985,391.

This invention relates to disc brake devices and is more particularly concerned with a disc-type brake assembly that is suitable for bicycles and similar vehicles.

One advantage of a disc brake system for bicycles is that it can be made self-energizing to some extent. When one of the brake pads engages the rotor, friction between the rotor and the brake pad urges the brake pad in the direction of rotor rotation. Such drag of the rotor upon the brake pad can be used to increase the friction-producing force with which the brake pad engages the rotor if the brake pad is arranged for an oblique motion between its released and rotor-engaging positions, so that is has both axial and circumferential components of such motion.

Thus, as compared with heretofore conventional caliper brake systems, wherein a rim of the wheel was engaged by brake pads, a disc brake system offers the very important advantage of being able to afford optimum braking action in response to relatively small actuating forces.

As with an airplane, however, the performance of a bicycle is very much affected by weight. Every ounce that must be added to a bicycle is cause for concern. Having in mind that a complete caliper brake system can weigh less than one pound, it is apparent that a bicyclist is likely to reject a disc brake system that would be substantially heavier — notwithstanding its greater safety and convenience — in view of the fact that such a disc brake system would tax his energy almost constantly when he was riding but would offer its advantages only during short and relatively infrequent braking intervals.

It is also important that a disc brake system for bicycles be capable of being installed on a bicycle without requiring any material modification of the conventional bicycle structure, without detracting from the appearance of the bicycle, and without interfering with normal operation of the bicycle or with the installation of commonly used accessories such as luggage carriers and fenders.

It is hardly necessary to add that a satisfactory disc brake system for a bicycle will be low in cost, sturdy, dependable and trouble free.

Having in mind these requirements, it is the general object of this invention to provide a disc brake system which is in all respects suitable for bicycles, which can be readily designed to have equally good braking action in wet and dry weather, and which is self-energizing so that optimum braking action can be obtained with very small actuating force.

Another general object of the present invention is to provide a self-energizing brake system for bicycles that is substantially safer and more convenient than the caliper brake systems heretofore conventional on gear-shift bicycles, and which can be readily installed on a bicycle as a replacement for a caliper brake assembly, utilizing the same hand lever previously employed for actuation of the caliper brake assembly but requiring the exertion of substantially less force upon that lever to obtain a superior braking action.

A further object of the invention is to provide a self-energizing disc brake assembly that can be quickly and easily installed on a bicycle without the need for modifying any of the heretofore conventional bicycle structure and which can be mass produced in a single model that is adaptable to almost all bicycles, regardless of make or size.

Another specific object of this invention is to provide a caliper assembly for a disc-type brake that is especially well suited for bicycles, which caliper assembly is held in place by nuts conventionally present on a bicycle to secure its rear wheel to one side of its frame and by bumpers or pads on the caliper assembly that have clamping but non-marring engagement with one of the longitudinal frame members of the bicycle, said caliper assembly thus being capable of being installed or removed as easily as the rear wheel itself and more ore less incidentally to installation or removal of that wheel.

It is also a specific object of this invention to provide a simple disc-type brake for a wheel that normally rotates in only one direction, said disc-type brake being to some extent self-energizing and comprising a disc-like rotor constrained to rotate with the wheel, a U-shaped body that straddles a portion of the rotor, a first brake pad fixed to one leg of the body, an opposing brake pad carried on the other leg of the body for movement relative to the body out of a normal released position in a direction generally towards the first brake pad but with a component of motion in the direction of rotor rotation, and means so mounting the body on structure which carries the wheel that the first brake pad can be engaged against the rotor by reaction of the body to force which said opposing brake pad exerts against the rotor in moving away from its said released position.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 6 is a disassembled perspective view of the caliper body assembly;

FIG. 7 is a fragmentary sectional view taken on the plane of the line 7—7 in FIG. 2;

FIG. 8 is a fragmentary sectional view taken on the plane of the line 8—8 in FIG. 7; and FIG. 9 is a sectional view taken generally on the plane of the line 9—9 in FIG. 1 but showing a modified form of spider.

Figure 1:
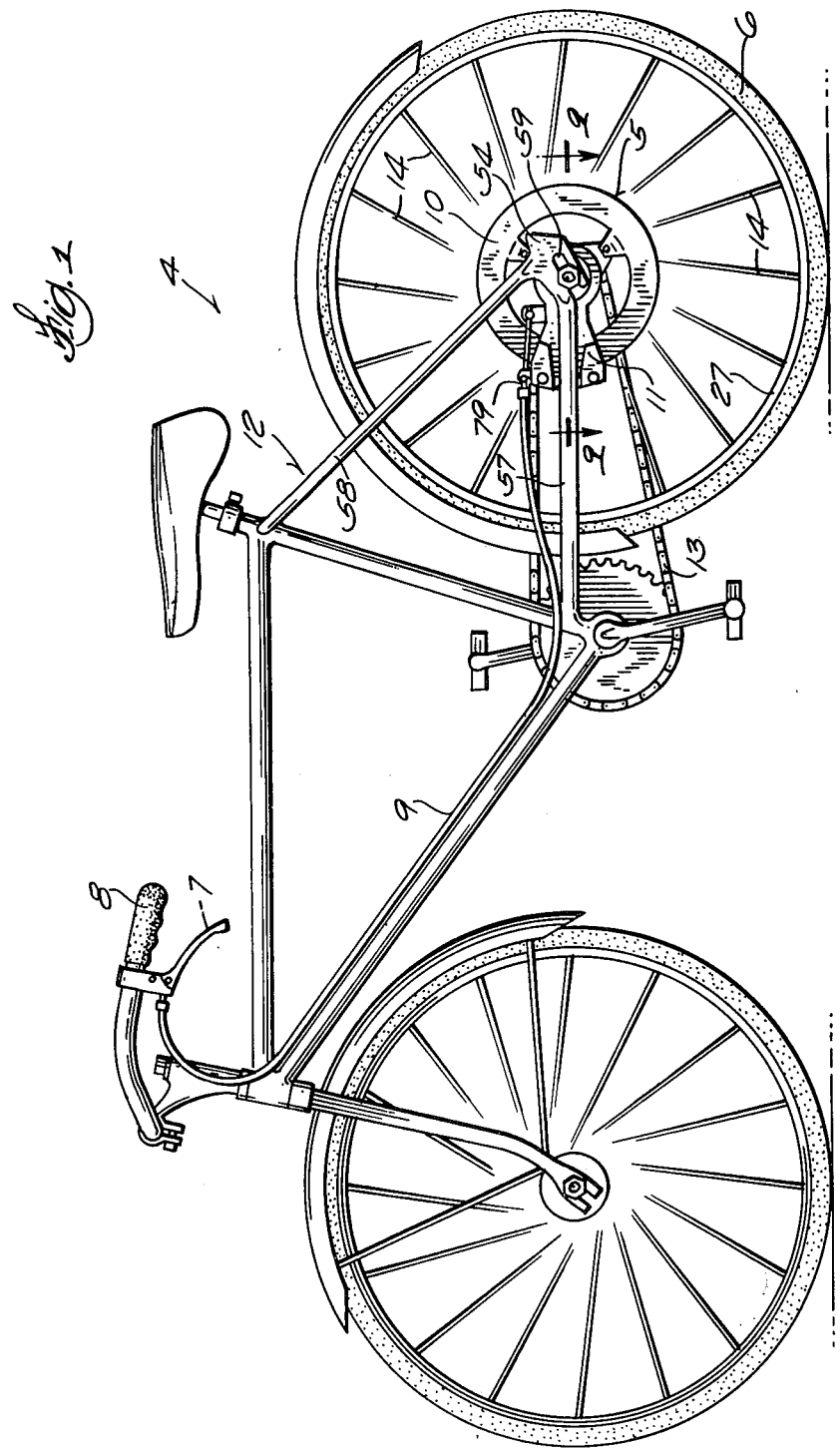
FIG. 1 is a side view of a bicycle on which is installed disc brake apparatus embodying the principles of this invention.
Figure 2:
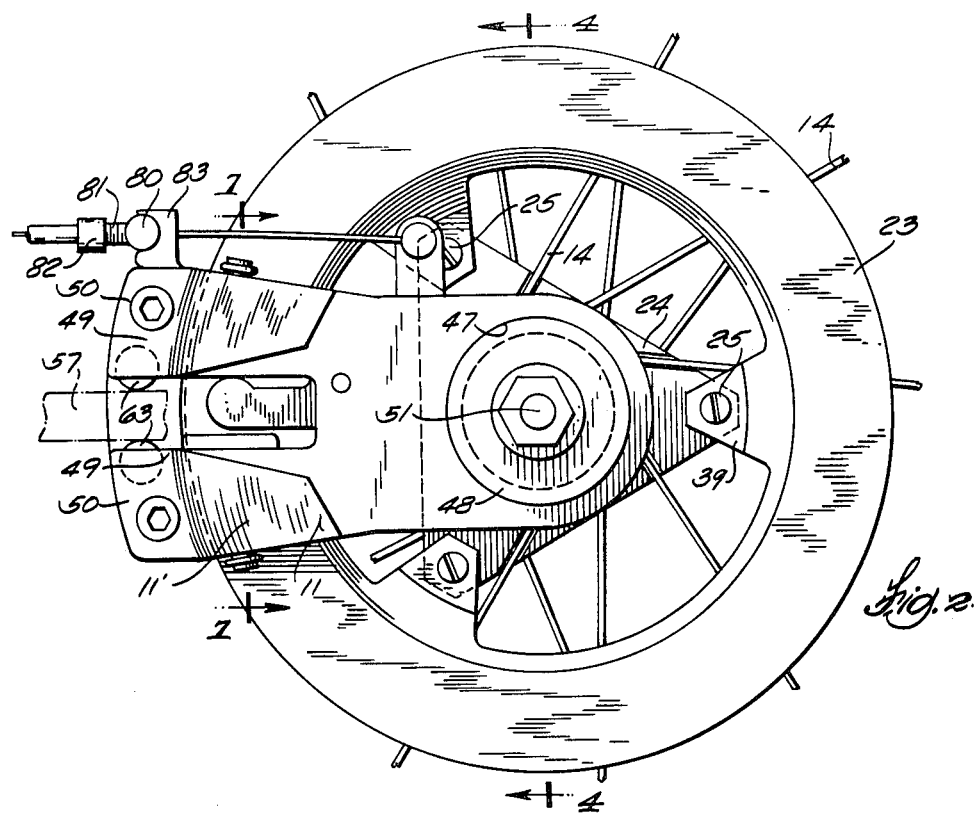
FIG. 2 is a view in side elevation of the caliper assembly of the disc brake apparatus of this invention, shown in operative relationship to its rotor.
Figure 3:
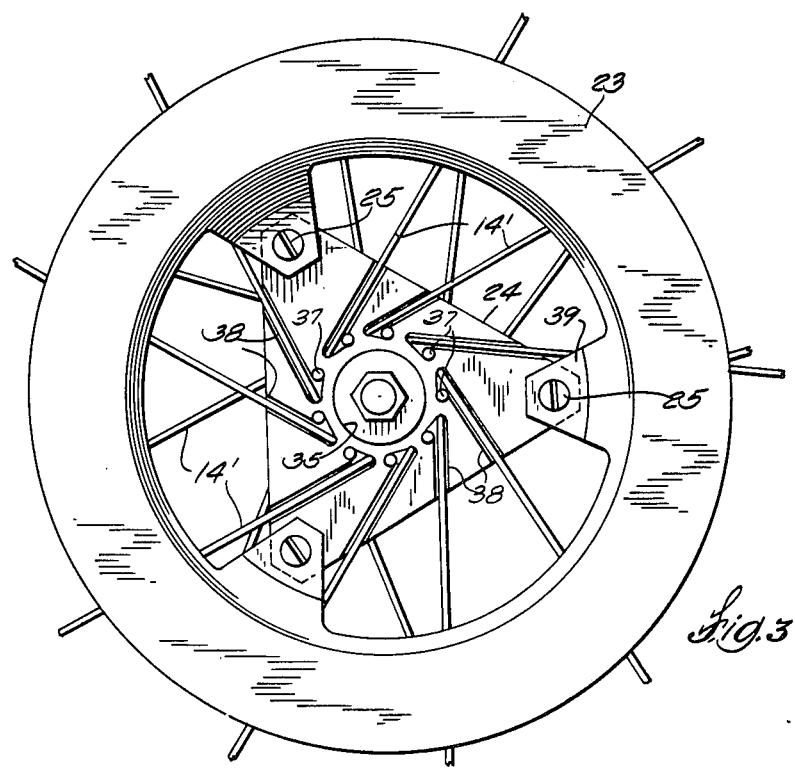
FIG. 3 is a view in elevation showing how the rotor is attached to a wheel.
Figure 4:
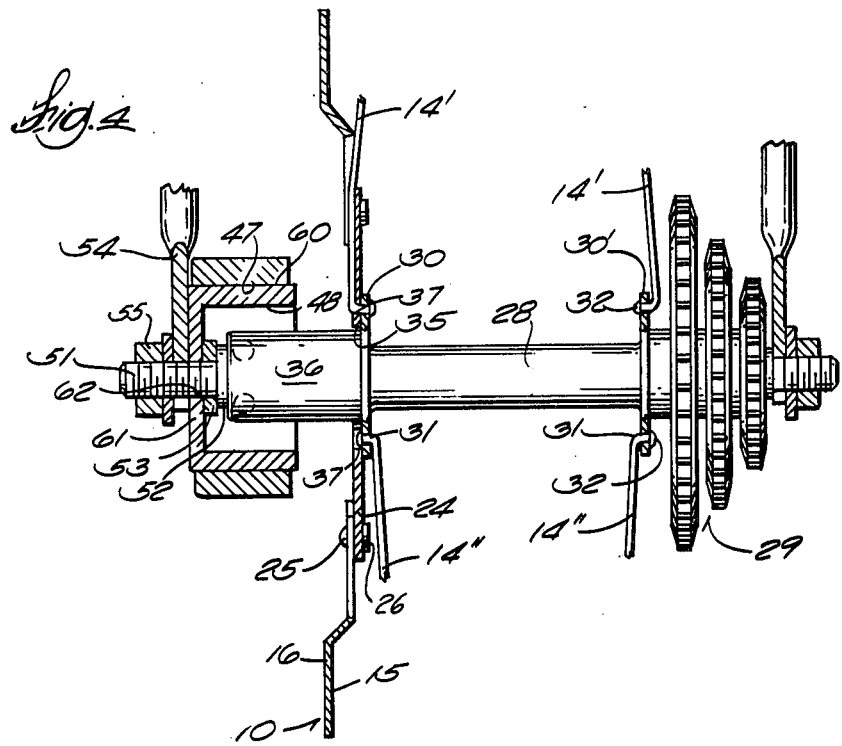
FIG. 4 is a sectional view taken on the plane of the line 4—4 in FIG. 2, on an enlarged scale.
Figure 5:
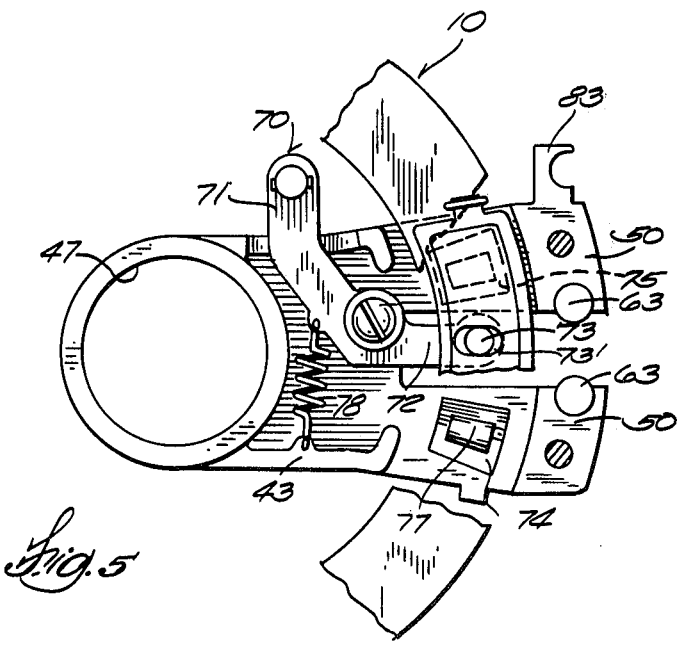
FIG. 5 is a plan view of the caliper assembly as viewed from the axially inner side of it, portions being shown broken away.

Referring now to the accompanying drawings, the numeral 4 designates generally a bicycle on which there is installed disc brake apparatus embodying the principles of this invention, designated generally by 5. The brake apparatus is illustrated as arranged for cooperation with the rear wheel 6 of the bicycle and as intended for actuation by means of a more or less conventional hand lever 7 on the handlebars 8, which hand lever is connected with the brake apparatus by a cable 9.

For purposes of example the brake apparatus 5 is shown and described only as applied to the rear wheel of a bicycle, but it will be understood that the principles of the invention are readily adaptable to front bicycle wheel installations, and also to motorcycles and certain other types of vehicles, as well as generally to the braking of wheels and other rotary elements that revolve in only one direction. On a bicycle, the advantages of the invention are of particular importance with respect to the rear wheel, inasmuch as the rear wheel should normally receive more braking force than the front one.

In general the brake apparatus 5 comprises a flat, annular rotor or disc 10 that is concentric to the rear wheel 6 and is constrained to rotate with it, and a caliper assembly 11 that is secured to the bicycle frame 12 adjacent to the rear wheel, at the side of the frame that is opposite the chain 13. The rotor 10 is spaced axially to one side of all of the spokes 14 of the wheel and is between the spokes and the frame. Thus the rotor has an axially inner flat surface 15 which faces the wheel spokes and an opposite outer flat surface 16.

The caliper assembly 11 comprises a body 11' that is generally U-shaped as viewed edgewise of the rotor, but with one of its legs 17 substantially longer than its other leg 18. The body 11' straddles an edge portion of the rotor, with its longer leg 17 overlying the outer surface 16 of the rotor and its shorter leg 18 overlying the inner rotor surface 15. A relatively fixed brake pad 18 is secured to the shorter leg 18, in flat-wise opposing relationship to the inner rotor surface 15; and a relatively movable brake pad 20 is carried on the longer leg 17 in opposing relationship to the outer rotor surface 16.

Contrary to generally conventional practice, the caliper body 11' is so mounted on the bicycle frame 12 (as explained hereinafter) that it can have limited motion in directions parallel to the wheel axis. The reason for such mounting of the body is to enable both of the brake pads 19 and 20 to frictionally engage the rotor 10 during brake application, even though only the brake pad 20 is movable relative to the caliper body. When the movable brake pad 20 engages the outer surface 16 of the rotor and exerts an axially inward force against it, there is of course an opposite reaction upon the caliper body by which that body is moved in the axially outward direction to carry the fixed brake pad 19 into engagement with the inner surace 15 of the rotor. Hence the freedom of the body for movement allows the brake pads to exert opposed and balanced clamping forces upon the rotor.

Turning now to a more specific description of the apparatus, and considering frist the rotor 10, it comprises a flat annular member 23, which constitutes the rotor disc itself, and a substantially flat mounting portion or spider member 24 by which the disc portion 23 is secured to the wheel 6. The two members are connected by means of suitable fasteners such as bolts 25 secured by nuts 26.

For an understanding of the spider member 24 and its connection to the wheel 6, reference can be made to our above mentioned U.S. Pat. No. 3,985,391, which describes in detail the construction of that spider member and the manner of its securement to the wheel 6. Suffice it to say that the spider member is connected with the hub 28 of the wheel by means of certain of the elongated wire spokes 14 of the wheel, in cooperation with a conventional radially outwardly projecting circumferential spoke flange 30' on the hub 28, to which those spokes are secured at their inner ends.

The annular disc member 23 that cooperates with the illustrated triangular spider has three circumferentially equispaced tab-like connecting arms 39 projecting radially inwardly from its inner circumference, preferably formed integrally with its annular portion. Each of these arms is bent obliquely out of the plane of the disc, all extending in the same axial direction, but the inner end portions of the several arms, which flat-wise overlie the apex portions of the spider, lie in a common plane. Each inner end portion of an arm has a bolt hole which can register with a bolt hole in the spider to receive one of the bolts 25 that connect the disc member to the spider member.

Because of the axial inclination of the radially outer portions of the arms, the annular portion of the disc member that constitutes the rotor proper is in axially outwardly spaced relation to the spider and is therefore spaced a substantial distance from all of the spokes of the wheel. Hence the shorter leg 18 of the caliper body, which carries the fixed brake pad 19, is readily accommodated in the space between the rotor and the spokes.

As illustrated, the caliper body 11' comprises a larger main body member 43 on which the movable brake pad 20 is mounted and which provides for attachment of the caliper assembly to a bicycle frame, and a smaller body member 44 that comprises the shorter leg 18 of the U and carries the fixed brake pad 19. Both body members can be made as aluminum castings. The body members 43 and 44 have flat surfaces 45, 45', respectively, at which they join one another, and those opposingly engaged surfaces lie in a plane that substantially coincides with the plane of the rotor disc. The two body members are connected by bolts 46.

As viewed along the wheel axis, the main body member 43 is substantially elongated and is bifurcated at its end that is connected with the smaller body member 44. It has a large hole 47 through its other end. In the hole 47 there is received a cup-shaped hub adapter 48 which is fixed concentrically to the wheel and on which the caliper body has a sliding fit. As the description proceeds, it will be seen that the body is free for axial sliding motion on the hub adapter but is confined against rotation around it by abutments that comprise outwardly projecting bosses 49 on the bifurcations 50 of the main body member, which abutments engage opposite sides of one of the elongated frame members of the bicycle.

Before considering the mounting of the caliper assembly 11 in more detail, it should be pointed out that a conventional bicycle wheel assembly comprises a relatively stationary axle shaft 51 which extends coaxially through the wheel hub 28 and which has threaded end portions that project substantial distances beyond the wheel hub. On the end portion of this shaft that is remote from the sprocket, a bearing cone 52 is threaded.

The bearing cone projects a distance into the hub to cooperate with a bearing (not shown) therein, and it may project axially outwardly beyond the hub. There is usually a locking nut 53 threaded onto the axle shaft against the bearing cone. The bearing cone of course does not rotate with the wheel and is thus in fixed relation to the axle shaft and the frame 12. Axially outwardly of the cone the axle shaft projects through a flat wheel supporting portion 54 of the frame. A clamping nut 55 that is threaded onto the outer end portion of the shaft, when tightened, cooperates with the bearing cone or its locking nut 53 to clamp the frame portion 54 and releasably fix the axle to the frame.

Conventionally, a bicycle frame has a V-shaped portion at each side of the rear wheel. Each such V-shaped portion comprises a lower elongated member 57 that is nearly horizontal and an upper elongated member 58 that extends down to the rear end of the lower member at a substantial inclination. The flat wheel supporting portion 54 of the frame projects generally rearwardly from the junction of these two elongated members. To enable the axle shaft to be adjusted fore-and-aft, for maintenance of chain tension, the wheel supporting portion has a slot 59 in which the axle shaft is received.

The caliper body extends forwardly from the cup-shaped hub adapter 48 to have the bosses on its bifurcated front end project across the lower elongated frame member 57, above and below the same, but the rest of the caliper body is located at the inner side of that frame member and of the wheel supporting portion 54.

The cup-shaped hub adapter 48, which supports the rear end of the caliper body, has a cylindrical side wall 60 and a substantially flat end wall 61. A concentric hole 62 in its end wall receives the axle shaft 51 with a close sliding fit, and upon securement of the wheel assembly to the frame, the end wall of the hub adapter is clamped between the frame portion 54 and the bearing cone or its locking nut 53, being thus held aginst all movement by the tightening of the clamping nut 55.

The cylindrical side wall 60 of the hub adapter projects axially inwardly to surround the bearing cone 52 and has an inside diameter and depth such as to be spaced both radially and axially from rotating parts of the wheel assembly. The outer cylindrical surface of the hub adapter side wall, as already explained, provides a bearing support for the caliper body 11' that provides for translatory sliding motion of the body in directions parallel to the wheel axis.

The caliper body is of course confined against rotation about the hub adapter 48 by its straddling cooperation with the lower elongated frame member 57. To prevent scratching or marring of that frame member, and to provide for smooth, easy motion of the caliper body in directions parallel to the wheel axis, the caliper body carries, at the opposing faces of its bifurcations, pads or bumpers 63 of nylon or similar smooth, hard but slightly resilient material, each in the form of a cylinder which has its axis parallel to that of the wheel. Each bumper 63 is held captive in a slot 64 in its bifurcation, which slot opens laterally towards the other bifurcation. In cross-section each slot 64 is arcuate and of a radius equal of that of the cylinder received therein, and its side walls define slightly more than a semi-circle so that it is somewhat narrower at its mouth than inwardly thereof. The cylinder is thus confined in the slot against radial motion relative to the body 11' but projects from the mouth of the slot all along its length. At its outer end each slot is closed, which is to say that it terminates short of the outer face of the body member; but it opens at its inner end to the surface 45 of the main body member that is overlain by the smaller body member 44. Hence the cylinders 63 can be axially inserted into their slots from the inner face of the main body member, and they are confined against axial movement by securement of the smaller body member to the main body member.

It will be observed that with the hub adapter in place on the shaft 51, and with the caliper body in place on the hub adapter, the wheel can be installed on a bicycle in a conventional manner, and its axle shaft can be adjusted along the slot 59 as necessary for chain tension, all without interference from the brake apparatus.

The fixed brake pad 19 can comprise a facing member of suitable friction material secured to the leg portion 18 of the smaller body member 44 in flatwise opposing relation to the inner surface 15 of the rotor. The brake pad is somewhat rectangular in outline, being elongated in the circumferential direction of the rotor, but its longer edges are curved in arcs that center on the wheel axis so that all portions of its surface can engage the rotor.

The movable pad 20 comprises a block-like shoe member 65 that is of the same general shape as the fixed brake pad. A friction facing 66 overlies the surface of the shoe member that opposes the rotor. The movable brake pad is of course carried on the inner face of the main body member 43, spanning its bifurcations.

For holding the movable brake pad in place on the body, the shoe member has a pair of tabs or lugs 67, one projecting lengthwise from each end thereof, and the main body member has opposing lugs 68, one adjacent to each lug 67 on the shoe member. A coiled garter spring 69 encircles each lug 67 on the shoe member and its contiguous lug 68 on the body. The garter springs of course permit the shoe member to have limited movement relative to the caliper body, but they tend to maintain the shoe member in a normal brake-disengaged position, spaced from the adjacent outer surface of the rotor and engaged with the inner face of the main body member.

A bent lever or bell crank 70 that overlies the inner face of the main body member provides for actuation of the movable brake pad. A longer arm 71 of the lever projects upwardly beyond the caliper body for connection to the cable 9, while the shorter arm 72 of the lever is confined between the shoe member 65 and the inner face of the body and is so oriented that its free end swings generally in directions circumferentially of the rotor and transverse to the length of the caliper body. An inwardly projecting pin 73 or the like, fixed on the free end of the shorter lever arm 72, rides in a closely fitting slot 73' in the shoe member to transmit motion of that lever arm to the movable brake pad. It will be seen that forward motion of the longer lever arm 71, in response to tension on the cable 9, causes the movable brake pad to move along a path and in a direction which correspond to normal movement of the portion of the rotor engaged by the movable brake pad. It will also be noted that the relationship of the shorter and longer arms of the bent lever 70 is such that the brake pad has a relatively small movement in response to a relatively large movement of the cable, so that a small force on the handlebar actuator lever 7 is translated into a large force on the brake pad.

The brake applying motion of the movable brake pad is a compound one in which the brake pad has one component of motion along an arcuate path defined by the curvature of its longitudinal edges and has another component of motion axially toward the rotor; but in such motion the brake pad is always maintained in an orientation such that its friction surface is parallel to the surfaces of the rotor. To cause the brake pad to have such an axial component of motion while it is maintained in the orientation just mentioned, the caliper body member 43 and the shoe member 65 have pockets 74 and 75, respectively, that open towards one another and define cooperating ramp surfaces. There are two such pockets 74 in the caliper body, one in the inner face of each of its bifurcations, and two pockets 75 in the shoe member, spaced and located to open into the pockets 74. As best seen in FIG. 7, each pocket is of substantially V-shaped cross-section, to provide a pair of oppositely inclined ramp surfaces 76. The two inclined surfaces of each pocket coverge towards a plane that contains the axis of the wheel, so that as viewed in plan the two pockets are in somewhat splayed relation to one another. Furthermore, each pocket diminishes in depth toward the wheel axis (that is, rearwardly), and since the ramp surfaces 76 of the pocket are flat, each pocket is slightly fan-shaped and forwardly divergent as viewed in plan.

A tapered roller 77 is confined in each pair of opposing pockets, to cooperate with the opposite ramp surfaces 76. The largest diameter end of the roller is in the deepest portion of the pocket, and the taper of the roller is such as to correspond to the depthwise taper of the pockets so that the desired orientation of the brake pad friction surface is maintained.

It will be apparent that as the movable brake member is moved lengthwise by swinging of the lever 70, the rollers 77, confined between the opposing ramp surfaces of the respective pockets 74 and 75, will cooperate with those ramp surfaces to impart to the shoe member a component of motion away from the caliper body member 43 and towards the rotor.

It will be understood that the angle of taper of the rollers and pockets is so selected as to cause the brake pad to move in an arc corresponding to the path of motion of the portion of the rotor that it engages. For purposes of clarity the taper of the rollers and pockets is exaggerated in FIG. 6.

Attention is directed to the fact that the two rollers 77 cooperate with the respective ramp surfaces in the pockets 74 and 75 to provide a support for the movable brake pad that is totally stable and by which it is maintained properly oriented at all times, and that they guide the movable brake pad for motion in the proper directions but permit it to have nearly frictionless motion relative to the caliper body.

When the movable brake pad contacts the rotor, frictional drag of the rotor upon the brake pad tends to drive the latter farther in the brake applying direction and thus more forcefully into engagement with the rotor, to afford a degree of self-energization of the brake.

The manner in which the fixed brake pad 19 is caused to engage the rotor, due to movement of the caliper body in reaction to force that the movable brake pad exerts against the rotor, has been described above.

A tension spring 78, reacting between the bent lever 70 and the main body member, biases that lever in the direction opposite to that of brake application. That tension spring therefore cooperates with the garter springs 69 to urge the movable brake pad towards its normal position in which its friction surface is slightly spaced from the rotor.

No special provision is made for disengaging the fixed brake pad 19 from the rotor when the brake is released, and none is necessary. The body has been found to move back promptly to a position in which the fixed brake pad is clear of the rotor. Evidently, the very slight amount of runout that is inevitably present in the inner surface 15 of the rotor is sufficient to kick the body to its brake-disengaged position during the first revolution of the wheel following brake release.

For smooth brake application it is essential that the cable 9 as well as other parts of the brake actuating mechanism shall have a free and efficient action. To this end, the rear end portion of the cable extends through a self-aligning cable guide 79 by which it is maintained oriented as nearly as possible at right angles to the lever arm 71 to which it is connected. The cable guide comprises a cylinder 80 of nylon or the like having a metal tube 81 extending transversely therethrough that receives the cable with an easy sliding fit. As is conventional, a sheath in which the cable is enclosed has a detachable connection 82 to the front end of the guide tube 81. The cylinder 80 is supported by a lug 83 that projects upwardly from the top of the main body member 43 near its front end. An arcuate groove in the front face of the lug receives the cylinder with a fit that allows the cylinder to rotate easily. The portion of the cable that extends to the rear of the guide tube 81 passes through a bore 84 in the lug 83 that is sufficiently larger in diameter than the cable to accommodate substantial lateral motion thereof. Note that the lug 83 so locates the cable guide that the rear end portion of the cable is substantially at right angles to the arm 71 of the bent lever when that lever is in the brake-disengaged position to which it is biased.

From the foregoing description taken with the accompanying drawings it will be apparent that this invention provides disc brake apparatus which is nicely adapted for bicycle applications by reason of its light weight, compactness and efficiency, and which brings an unprecedented convenience and safety to hand-operated bicycle braking. It will also be apparent that the apparatus of this invention is very versatile in that it can be installed on practically any make, model or style of bicycle without requiring any modification of the bicycle structure, without detracting from the appearance of the bicycle and without interfering in any way with its normal operation or with the installation on it of commonly used accessories.

Those skilled in the art will appreciate that the invention can be embodied in forms other than as herein disclosed for purposes of illustration. The invention is defined by the following claims.

We claim:

1. A disc brake caliper assembly for a wheel of a vehicle such as a bicycle, said wheel being journaled on a non-rotating shaft, and said vehicle having a frame and having cooperating attachment means on its frame and on said shaft, on one end portion thereof, for releasably fixing said shaft in relation to the frame, said caliper assembly being of the type comprising a body that carries a pair of opposing brake pads, one of which can be actuated towards the other against bias to cause the brake pads to clampingly engage a rotor that rotates with the wheel, said caliper assembly being characterized by:

A. a substantially cup-shaped adapter
 1. having a hole in its end wall through which said end portion of the shaft can pass with a close fit,
 2. the end wall of said adapter having inner and outer surfaces clampingly engageable by said attachment means to confine the adapter against movement relative to the shaft, and
 3. the side wall of said adapter having a cylindrical external surface and having an inside diameter and an axial length such as to be spaced from rotating parts of the wheel adjacent to said attachment means; and B. the body
 1. having a bore near one end thereof in which said adapter is received with a sliding fit, and
 2. having near its other end opposing bumpers that extend in directions parallel to the axis of said bore and are spaced apart a distance to snugly embrace a part on said frame so that they can cooperate with said part in confining the body against rotational movement about said adapter while permitting the body to have limited movement in said directions for engagement of both brake pads against the rotor under mutual reaction forces.

2. The disc brake caliper assembly of claim 1 wherein said other end portion of the body is bifurcated, further characterized by:

said bumpers comprising a pair of cylinders of a smooth, hard but slightly resilient plastic material, said bumpers being confined in elongated grooves in the bifurcations of the body that open towards one another and have their axes substantially parallel to the axis of said bore.

3. In a disc brake caliper assembly comprising a body that carries opposing fixed and movable brake pads, the movable brake pad being actuatable in one direction for engagement with one face of a disc-like rotor and the fixed brake pad being carried in the opposite direction, for engagement with an opposite face of the rotor, by reaction of the body to force that the movable brake pad exerts upon the rotor, means for mounting the body on a bicycle or similiar vehicle wherein a wheel that carries said rotor at one axial side thereof is confined to rotation on non-rotating structure secured to a frame and wherein parts of said non-rotating structure are concentric to the wheel and are adjacent thereto at said axial side thereof, said means for mounting the body comprising:

A. an adapter having a cylindrical outer surface and a concentric hole therethrough, said adapter
 1. being arranged to have one of said parts of the non-rotating structure extend through said concentric hole and to be held by said parts in fixed relation to the non-rotating structure and in spaced relation to rotating parts of the wheel, and
 2. having its cylindrical surface slidably received in a bore in said body, which bore has its axis extending in said directions; and B. means on said body, spaced from said bore, defining a pair of opposing surfaces which extend in said directions and which are spaced apart by a distance such that they can cooperate in clampingly gripping opposite sides of a portion of the frame that is near said non-rotating structure and extends substantially transversely to the wheel axis, the engagement of said surfaces with said portion of the frame confining the body against rotation about said non-rotating structure without interfering with limited motion of the body in said directions.

4. In a disc brake caliper assembly comprising an elongated body that carries opposing fixed and movable brake pads near one end thereof, the movable brake pad being actuatable in one direction for engagement with one face of a disc-like rotor and the fixed brake pad being carried in the opposite direction, for engagement with an opposite face of the rotor, by reaction of the body to force that the movable brake pad exerts upon the rotor, means for mounting the body on a bicycle or similar vehicle wherein a wheel that carries said rotor at one axial side thereof is confined to rotation on non-rotating structure secured to a frame and wherein parts of said non-rotating structure are concentric to the wheel and are adjacent thereto at said axial side thereof, said means for mounting the body comprising:

A. a substantially cup-shaped adapter received with a sliding fit in a bore in the body near the other end thereof, which bore has its axis extending in said directions, said adapter
 1. having a concentric hole in its end wall through which one of said parts of the non-rotating structure can extend to hole the adapter concentric to the wheel,
 2. having axially opposite surfaces on its end wall that are clampingly engageable by others of said parts to confine the adapter against rotation and axial movement, and
 2. having its side wall of such inside diameter and depth as to surround certain of said parts and to be in spaced relation to rotating parts of the wheel; and B. means on the body, near said one end thereof, defining opposing abutment surfaces that extend in said directions, said surfaces being spaced apart by a distance to snugly receive between them a portion of said frame that is near said non-rotating structure, said surfaces thus cooperating with said portion of the frame to confine the body against rotation about said adapter without preventing limited movement of the body in said directions.

5. The disc brake caliper assembly of claim 4 wherein said fixed brake pad is formed separately from the body, further characterized by:

1. said one end portion of the body being lengthwise bifurcated transversely to said directions and having surface portions on its bifurcations that face in one of said directions,
2. means securing the fixed brake pad to the body in overlying relationship to said surface portions on the bifurcations,
3. each of the bifurcations of the body having an elongated groove therein that opens along its length towards the groove in the other bifurcation, each said groove being narrower at its mouth than inwardly thereof, having one end that opens to one of said face portions of the body, and having its other end closed; and
4. said means defining opposing abutment surfaces comprising a pair of bumpers of smooth and hard but slightly resilient material, each having a portion which closely fits one of said grooves and is confined therein and having another portion which projects beyond the mouth of its groove and towards the opposite groove, each bumper being axially insertable into its groove from the first mentioned end of the groove and being retained in its groove by securement of the fixed brake pad to the body to close said first mentioned ends of the grooves.

6. In a bicycle comprising a frame, a wheel confined to rotation on fixed structure comprising a shaft, means for releasably securing said fixed structure to said frame in any of a plurality of positions of forward and rearward adjustment relative to the frame, a disc-like rotor confined to coaxial rotation with the wheel at one axial side thereof, and a brake caliper assembly comprising an elongated body that carries opposing fixed and movable brake pads near one end thereof, the movable brake pad being actuatable in one direction parallel to the axis of said wheel for engagement with one face of said rotor and by its reaction thereagainst carrying the fixed brake pad in the opposite direction for engagement with the opposite face of the rotor, and said brake pads being adapted to engage the rotor at substantially a predetermined distance from its axial, means for so mounting said body on the bicycle as to accommodate forward and rearward adjustment of said fixed shaft structure and enable the body to have limited motion in said directions so that the fixed brake pad can be carried towards and from the rotor, the last mentioned means comprising:

A. a substantially cup-shaped adapter received with an axially sliding fit in a bore in said body near the other end thereof, which bore has its axis extending in said directions, said adapter
 1. having a concentric hole in its end wall through which said shaft extends to hold the adapter concentric to the wheel at said axial side thereof and having its end wall clampingly confined against another part of said fixed structure, and
 2. having its side wall of such inside diameter and depth as to surround parts of said fixed structure and to be in spaced relation to rotating parts of the wheel and the rotor; and B. cooperating means on the frame and on the body, defining two pairs of abutment surfaces that extend in said directions, one of said pairs of surfaces being on the body, near said one end thereof, the other being on the frame, and the surfaces of each pair being vertically spaced from one another and oppositely facing, each abutment surface of one pair being opposingly engaged against an abutment surface of the other pair to confine the body against rotation about the axis of the wheel without interfering with limited movement of the body forwardly, rearwardly and in said directions.

7. The bicycle of claim 6 wherein said pair of abutment surfaces on the body are defined by opposing bumpers engaged against opposite top and bottom surfaces on a member which is in fixed relation to the frame.

* * * * *